United States Patent [19]
Panther et al.

[11] Patent Number: 5,551,079
[45] Date of Patent: Aug. 27, 1996

[54] RADIO PAGER HOLSTER ASSEMBLY

[75] Inventors: Gyles Panther, Stittsville; J. Peter Williams, Munster; Donald W. F. Campbell, Nepean, all of Canada

[73] Assignee: Silcom Research Limited, Kanata, Canada

[21] Appl. No.: 52,534

[22] Filed: Apr. 29, 1993

[30] Foreign Application Priority Data

Apr. 30, 1992 [CA] Canada .................................. 2067624

[51] Int. Cl.⁶ ........................................................ H04B 1/08
[52] U.S. Cl. ............................ 455/347; 455/90; 455/351; 340/825.44
[58] Field of Search .......................... 340/311.1, 825.44, 340/825.46; 455/344, 346, 347, 348, 349, 351, 89, 90; 224/252, 269; 16/277, 286, 291, 292

[56] References Cited

U.S. PATENT DOCUMENTS

| | | | |
|---|---|---|---|
| 3,214,685 | 10/1965 | Brenner | 224/269 |
| 4,641,370 | 2/1987 | Oyamada | 455/90 |
| 4,879,759 | 11/1989 | Matsumoto et al. | 455/348 |
| 5,181,023 | 1/1993 | Fujii | 340/825.46 |
| 5,210,532 | 9/1991 | Knoedler et al. | 455/90 |
| 5,385,282 | 1/1995 | Chen | 455/351 |

*Primary Examiner*—Edward F. Urban
*Attorney, Agent, or Firm*—Pascal & Associates

[57] ABSTRACT

A holster assembly for retaining a radio pager or data receiver including a clip fixed to the assembly having a first position for resiliently clamping the holster assembly to an article of clothing and another stable open position for supporting the assembly on a surface as a stand for the pager or receiver, a vibrator alert apparatus and a battery connected thereto contained wholly within a housing formed by the holster assembly.

6 Claims, 9 Drawing Sheets

RADIO PAGER HOLSTER ASSEMBLY

FIELD OF THE INVENTION

This invention relates to radio pagers or radio data receiving devices which may be clipped to the clothing or belt of the user, or used as desk top units.

BACKGROUND TO THE INVENTION

In the past, it has been common to equip radio pagers and radio data receivers with clips to allow those devices to be attached to the user's clothing or belt. Commonly, such clips are permanently attached to the devices, or are detachable or are attached to a holster in which the pager may be carried. A major advantage of clothing or belt attachment is that mechanical vibrating alert devices, which are widely used, are most effective when the pager or data receiver is firmly coupled to the user's body and which occurs with clothing or belt attachment.

It is desirable to be able to read the display of such a device when clipped to the belt. This is convenient for a device with a top mounted display, but front face display units require rotation through approximately 90 degrees. A display is inverted when viewed from the belt, and it is necessary to also provide for display reversal for reading on the belt.

Traditionally designed belt clips allow a very limited angle of rotation to facilitate viewing, typically 30 degrees. One model of pager has a separated belt clip which attaches to the pager only at a pivot at the top of the pager, thus providing a large angle of rotation. Another, which is described in U.S. Pat. No. 4,802,241, has a two part clip with a wide opening angle but with the closure spring exposed which, in use, traps dirt and becomes unsightly.

Clips attached to pagers are awkward to attach and to remove from belts, and to overcome this, pager manufacturers commonly provide optional holsters, which provide for belt attachment and at the same time, ease of extraction of the pager for inspection of the display.

When working at a desk it is sometimes desirable to move the pager to the desk so that incoming messages may be conveniently observed. Some pager manufacturers have designed holster products and pager clips such that these can be used as desk stands. However, because this is not the primary application they are commonly poorly suited to this use.

The current trend is to make pagers as thin as is possible. Vibrating alert devices ("vibrators") have very high current consumption compared with audible or visual alert modes and pagers with built in vibrators require relatively large batteries. A previous invention of two of the present inventors involves the integration of a vibrator in a holster for a pager or data receiver. However, that configuration required that the vibrator be driven from the power source within the pager or data receiver. We have discovered that major benefits can be derived from mounting both the vibrator and its power source in a holster or detachable clip, i.e. the pager itself need not carry the power supply for the vibrator, thus allowing the pager to be minimized in size and weight, yet allow it to use a vibrating alert in the carrying position in which the pager uses such form of alert.

SUMMARY OF THE INVENTION

An embodiment of the invention is a clip for radio pagers or data receivers which has a very wide opening angle. A novel spring mechanism is described which is hidden in the support tower of the clip assembly, together with a novel mechanism which provides for use of the belt clip as a desk easel.

Another embodiment of the invention is a holster or detachable clip configuration whereby the vibrator is integrated into a support tower for the clip to minimize the volume necessary to package the vibrator.

Another embodiment of the invention is the integration of the power source (battery) for a vibrator into a support tower for the clip on a holster or detachable clip so as to minimize the volume required to house it and whereby significant benefits are provided for the pager with which it is integrated.

In accordance with another embodiment of the invention, a holster assembly for a radio pager or data receiver is comprised of a holster for retaining the pager or receiver, a clip rotatably fixed to the holster, apparatus for resiliently biasing the clip to the rear of the holster, an actuator engaging the clip whereby by manually pinching the actuator to the holster, the clip is rotated away from the holster and by releasing the actuator the clip is resiliently biased toward the rear of the holster, and latching apparatus for retaining the clip in a fixed position away from the holster upon the clip being manually pulled away from the holster.

In accordance with another embodiment of the invention, a holster assembly for a radio pager or data receiver is comprised of a holster for retaining the pager or receiver, a clip resiliently biased toward and rotatably fixed to the holster, apparatus for temporarily rotating the clip from the holster while maintaining its resilient bias toward the holster, and apparatus for retaining the clip away from the holster at a fixed open position until released from the fixed open position.

In accordance with another embodiment of the invention, a holster assembly for a radio pager or data receiver is comprised of a holster for retaining the pager or receiver, a clip resiliently biased toward and rotatably fixed to the holster, apparatus for temporarily rotating the clip from the holster while maintaining its resilient bias toward the holster, a vibrator alert apparatus for actuation by the pager or receiver, which is contained wholly within a housing formed by the holster, and connector apparatus for connecting the vibrator with the pager or receiver upon the pager or receiver being retained in the holster.

In accordance with another embodiment of the invention, a holster assembly for retaining a radio pager or data receiver includes a clip fixed to the assembly having a first position for resiliently clamping the holster assembly to an article of clothing and another stable open position for supporting the assembly on a surface as a stand for the pager or receiver.

BRIEF INTRODUCTION TO THE DRAWINGS

A better understanding of the invention will be obtained by reference to the detailed description below, in conjunction with the following drawings, in which:

FIG. 1 is an isometric view of an assembled belt clip in accordance with the invention, FIG. 2 is an exploded view of parts of the invention, FIG. 3 shows a detail of an actuator portion of the invention, FIGS. 4A and 4B illustrate operation of the actuator and clip portion of the invention in two positions, FIG. 5 is a sectional view of the clip and drum portion of the invention, FIG. 6 is a detail of interfacing faces of actuator disks and the clip drum portion of the invention, FIG. 7 illustrates the invention in a desk top pager supporting position, FIG. 8 is an isometric partly cut-away view of the invention, and FIG. 9 is a schematic diagram of the electrical portion of an embodiment of the invention.

DETAILED DESCRIPTION OF THE INVENTION

Figure 1:
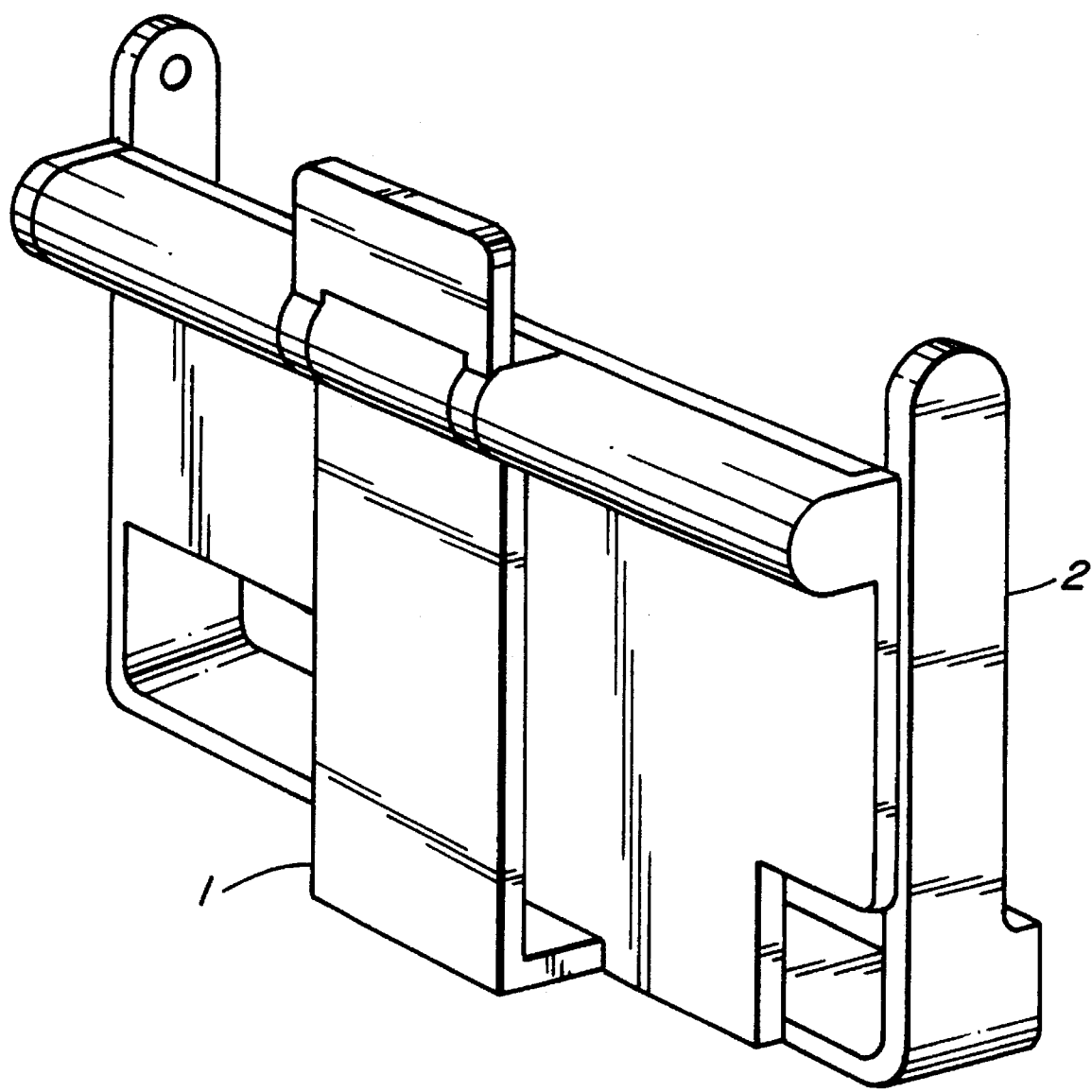
Figure 2:
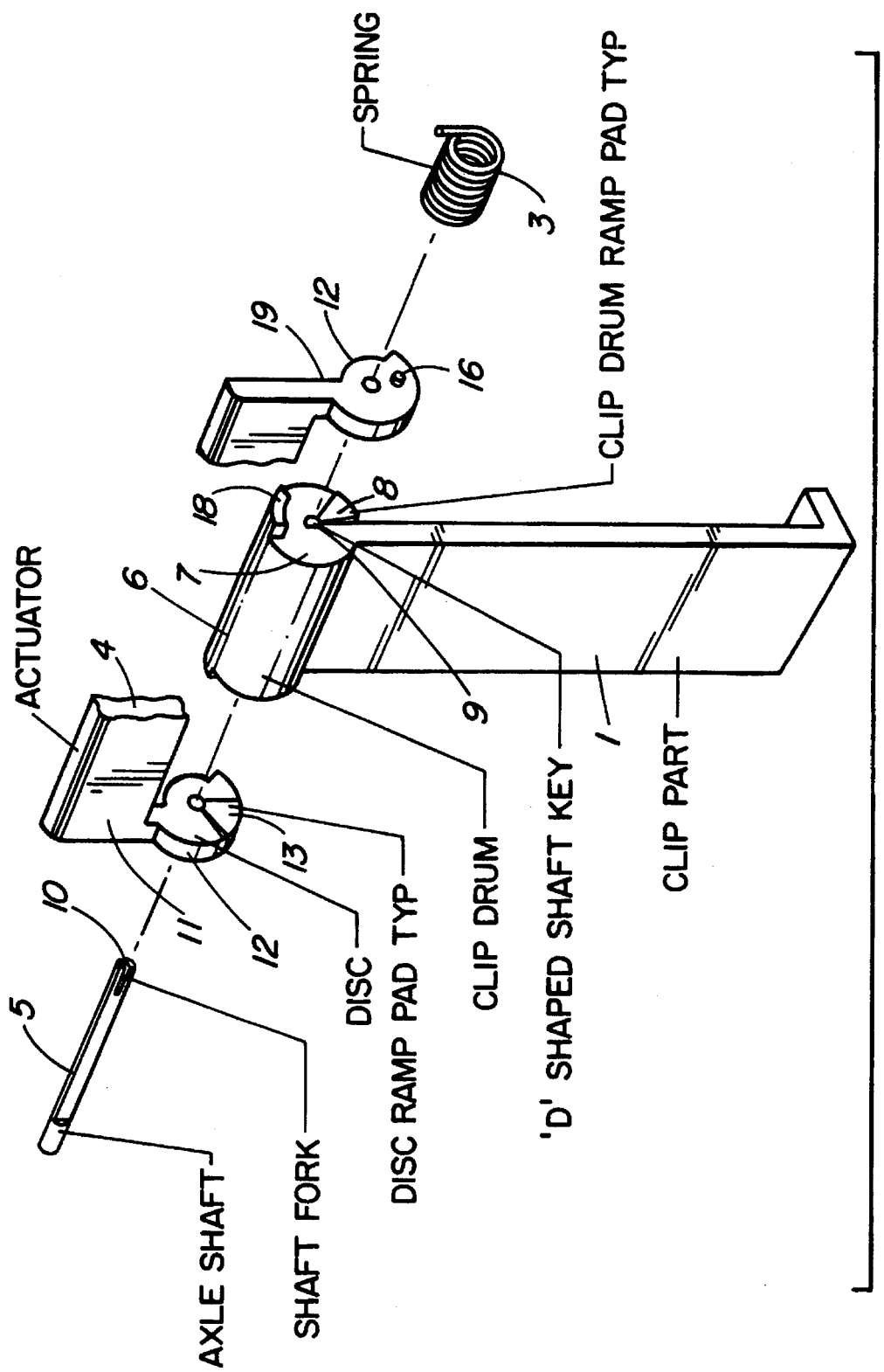

FIG. 1 is a drawing of the assembled belt clip 1 as attached to a holster 2, an exploded view of the clip mechanism portion being shown in FIG. 2. The mechanism is comprised of four parts, these being a spring 3, an actuator 4, a clip 1 and an axle 5. The spring 3 is a helical coil spring which serves to maintain closure pressure on the clip.

The clip 1, in combination with the bulkhead of the pager inserted into the holster or the holster forms the actual attachment clip fingers. The clip 1 has a drum 6, the center of which is the center of rotation for the clip, and the end faces 7 of which contain ramp pads 8 which provide an easel lock function as described below. The clip drum is keyed onto the axle which extends beyond the drum section at each clip, by means of a key 9. One end of the axle contains a fork 10 to provide for keying of the axle into the helical spring.

Figure 3:
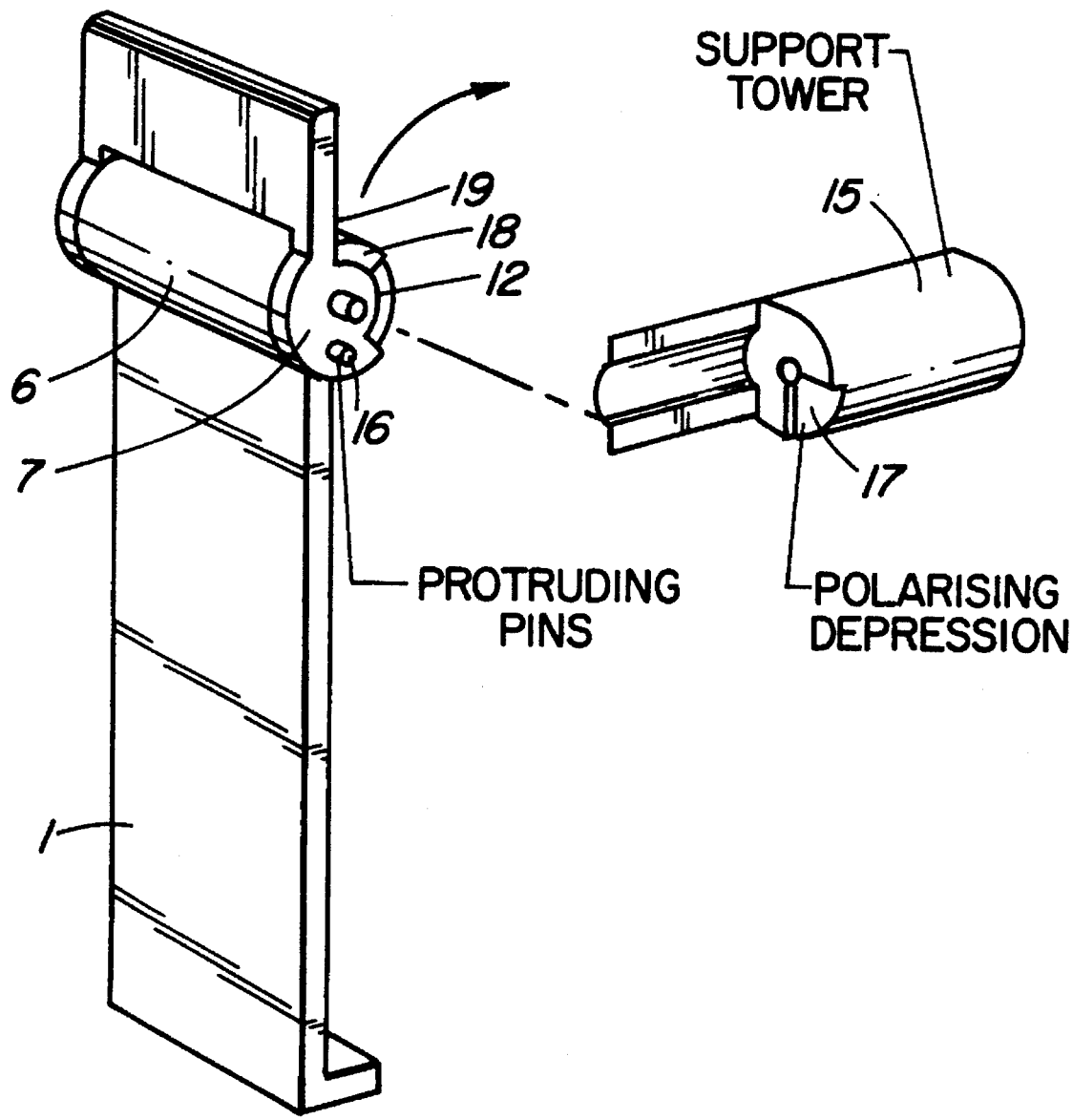

The actuator 4 is also mounted on the axle 5 and is free to rotate upon it, and forms the means by which manual pressure is applied to open the clip. The actuator has a flat area 11 where pressure is applied and two generally circular separated legs or actuator disks 12, the inside faces of which also contain ramp pads 13. The actuator has the appearance of an elongated and inverted "U" with the verticals being formed by the end profile of the actuator disks (see FIG. 3 showing the parts of FIG. 2 as assembled). This provides a spring action when the actuator disks are deformed apart by the action of ramp pads 13 on the disks 12 against the ramp pads 8 on the end faces 7 of the clip drum 6.

The assembly is supported by towers 15 which may also house one or more of a vibrator alert motor, a power supply jack and a vibrator battery. The outside faces of the actuator disks 12 have protruding pins 16 which travel in sidewall depressions 17 of the tower 15. These depressions polarize and limit the anticlockwise rotation of the actuator, where rotation direction is shown by the curved arrow in FIG. 3.

Figure 4A:
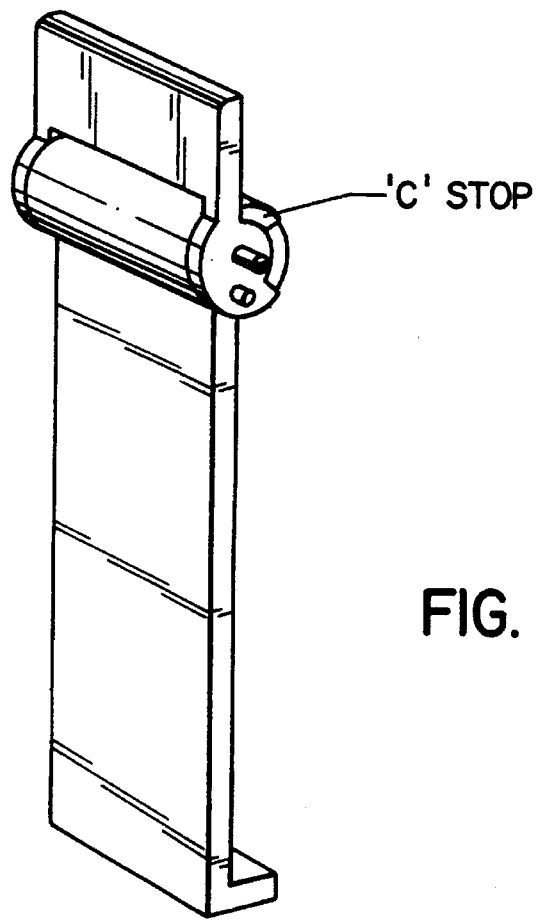
Figure 4B:
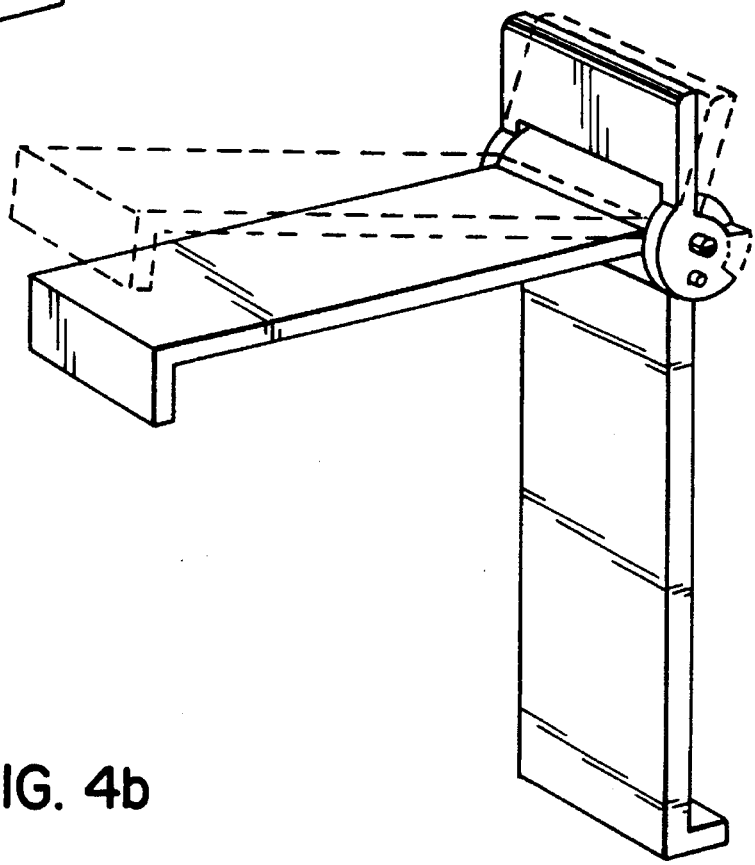

"C" stops 18 protrude from the end faces of the drum. Each end of each "C" stop is opposed to a limiting surface 19 on the actuator 11 and these serve to limit the rotation of the actuator 11 and clip 1 relative to each other as shown in FIG. 4A and FIG. 4B. At the most clockwise rotation of the actuator relative to the clip, both parts are in line, and clockwise force applied to the actuator in this position is applied to the clip as an opening force. At the most clockwise rotation of the clip arm relative to the actuator the smaller angle between them is less than 90°, as may be seen in FIG. 4B.

Figure 5:
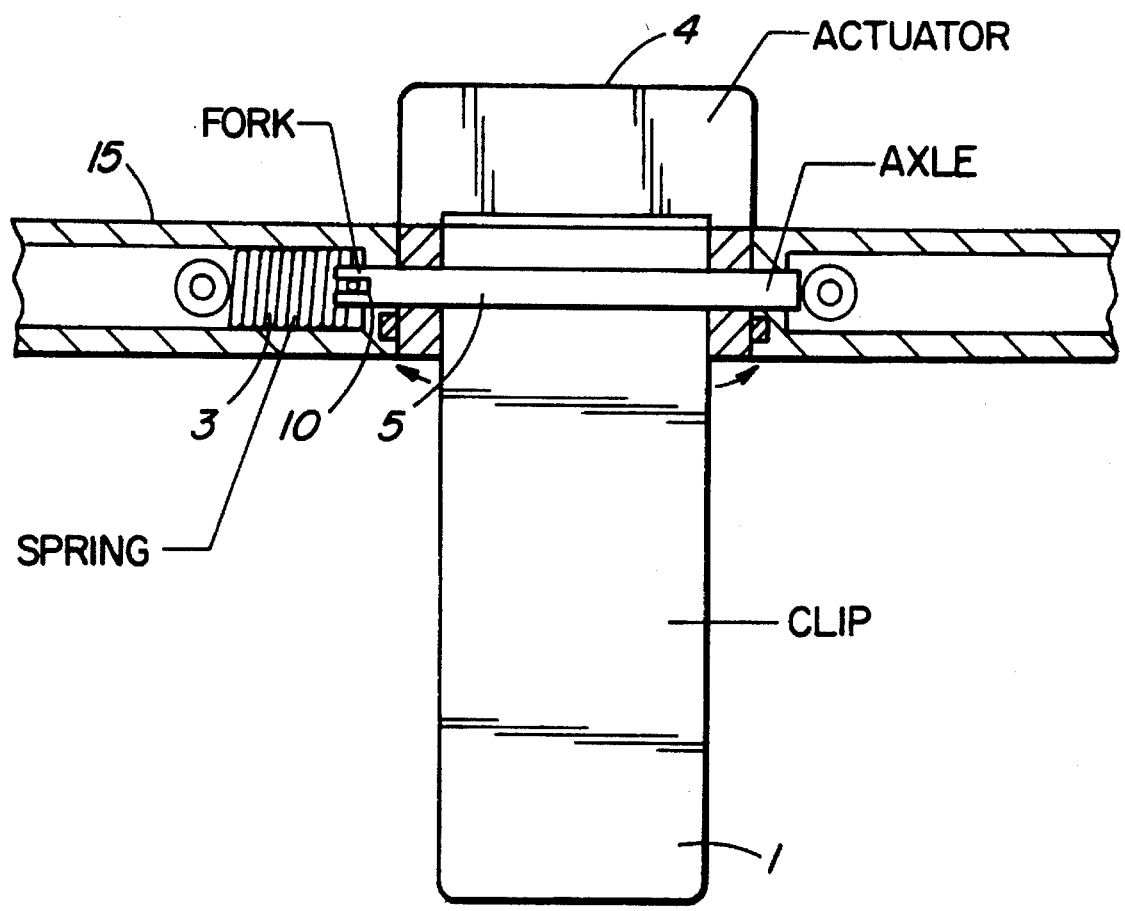

As shown in FIG. 5, the spring 3 is concealed within a tower 15 with one end keyed into the tower and the other end keyed into the fork 10 of the axle 5. The spring is pre-loaded so that the clip 1 is under tension, even when closed.

Thus, when both parts are vertical the clip 1 is under closing tension from the spring 3 and is restrained by the holster 2 bulkhead. A clockwise rotation of the actuator 4 causes the clip to also rotate clockwise, thereby opening the clip. The spring tension on the clip is transmitted to the actuator 4 so that the user feels a closing force.

By these mechanisms, a clip attachment is provided which has an opening angle of greater than 90°. This permits the user to rotate the body of the holster, containing the pager or other receiver sufficiently for its front face display to be easily read. The closing spring is concealed in one of the support towers, thus reducing unsightly dirt build up in use.

In accordance with another embodiment, a mechanism enables the clip 1 to be locked in the opened condition so that the holster can be used as a desk easel.

Figure 6:
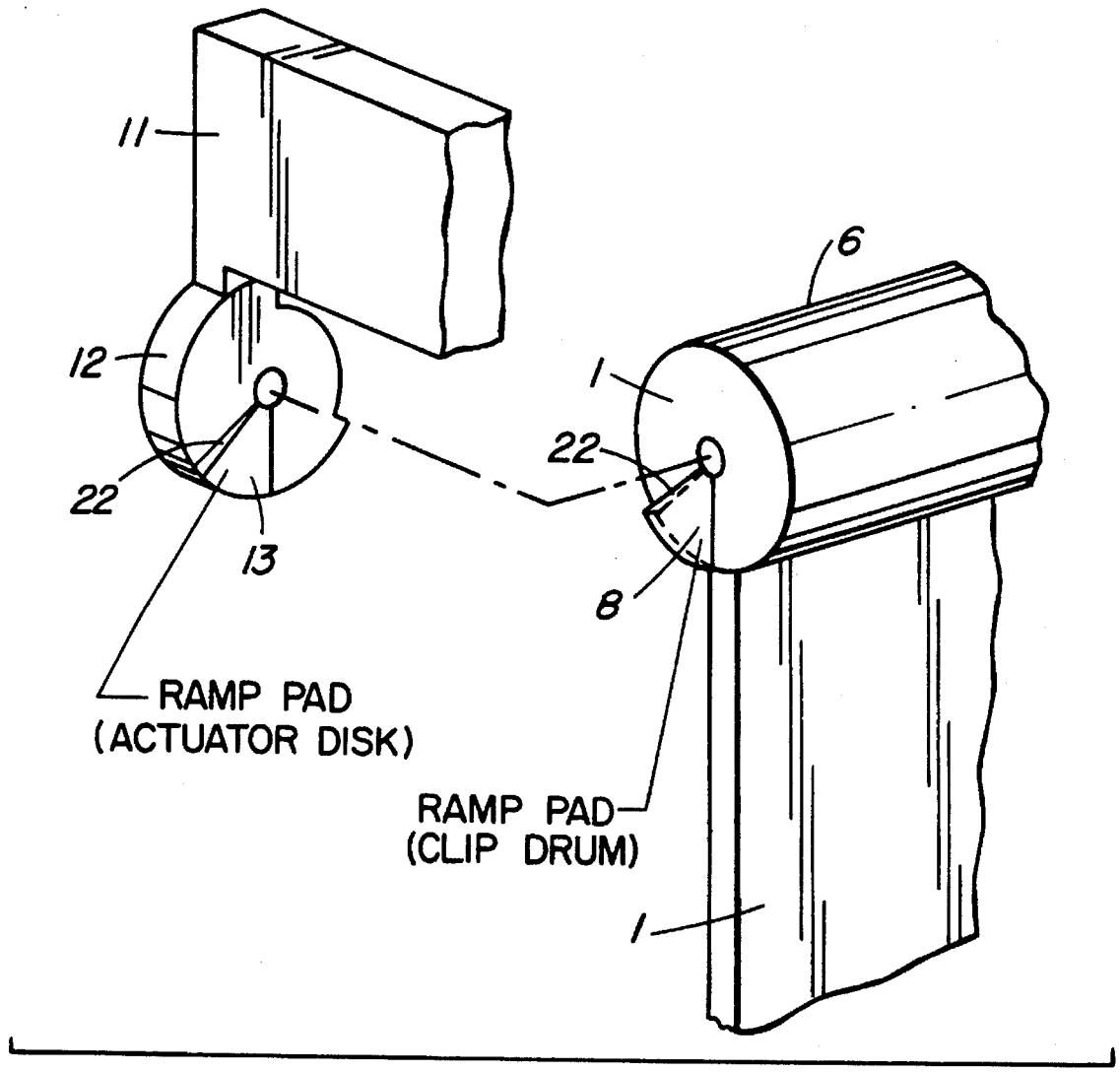
Figure 7:
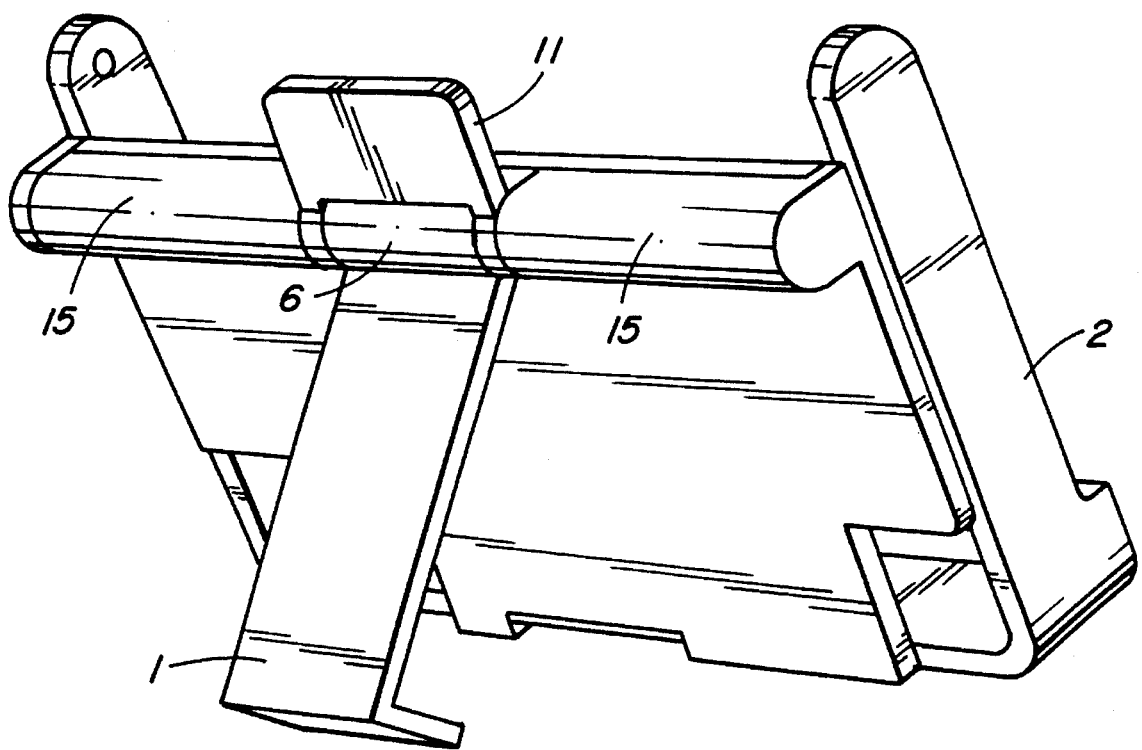

With reference to FIG. 6, the interfacing faces of the actuator disks and the clip drum contain opposing low angle ramp pads. These are structured so that, as the clip is rotated clockwise relative to the actuator (i.e. widely opened by the clip) the two actuator disks are forced apart and the actuator is thus loaded, as described above. However in this case, at an "arbitrary point" in the rotation, the ramp pads on both faces have high angle stress relief ramps 22, so that when these are opposed the stress is relieved on the actuator, giving a "clicking" action and maintaining the clip in an opened position. This can also be achieved by a protrusion on one ramp engaging a depression in the other, or by the ramps being allowed to move past the ends of each other, causing their two end walls to latch. The position of the clip open relative to the holster as an easel is shown in FIG. 7.

If the clip 1 is then released, the spring pressure is opposed by forces from the opposed high angle ramps, and the clip is weakly locked open for use as a desk easel. To close the clip 1, light closing pressure is applied to it, which adds slightly to the spring torsion, and causes the ramps to ride up over each other, whereupon the clip closes under the restoring force of the spring 3.

Permanent deformation of the spring caused by extended periods in the easel position will be negligible because of the low loading of the coil spring in torsion. Similarly, because the deformation of the actuator during the lock/unlock cycles is small relative to its dimensions its elasticity will not be compromised.

Figure 8:
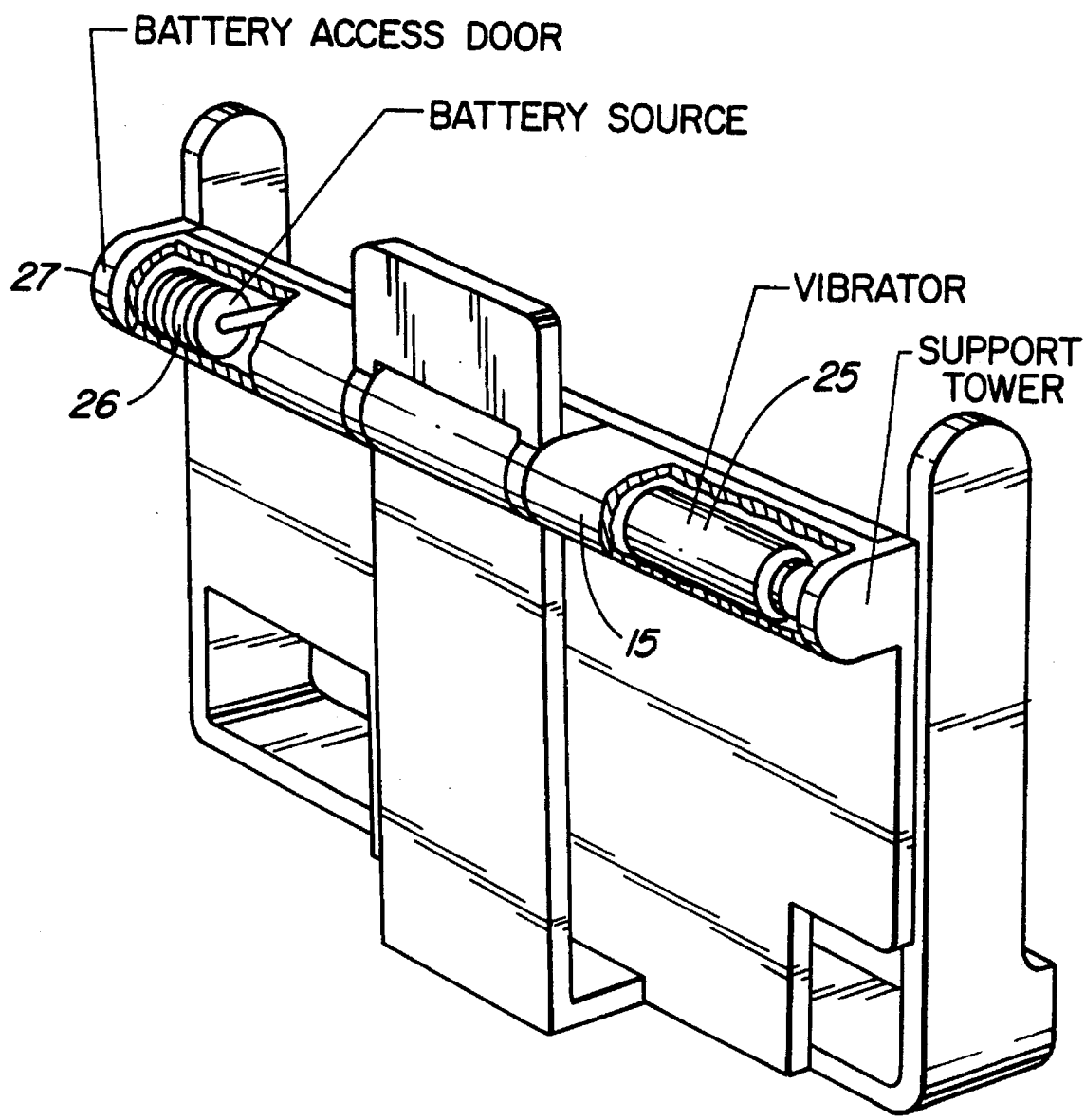

The assembly is preferred to contain a vibrator 25 alerting device and a battery 26 concealed within a tower 15, as shown by the broken open view of FIG. 8. A vibrator motor and accompanying counterweight which forms the vibrator has a thin cylindrical shape factor and consequently can be integrated within he tower with virtually no additional space requirements. The battery can be changed by an access door 27 at the end of one tower tight mechanical coupling results between the vibrator and the assembly, so that the vibrator motor power can be minimized while maximum vibration energy is applied to the wearer.

Figure 9:
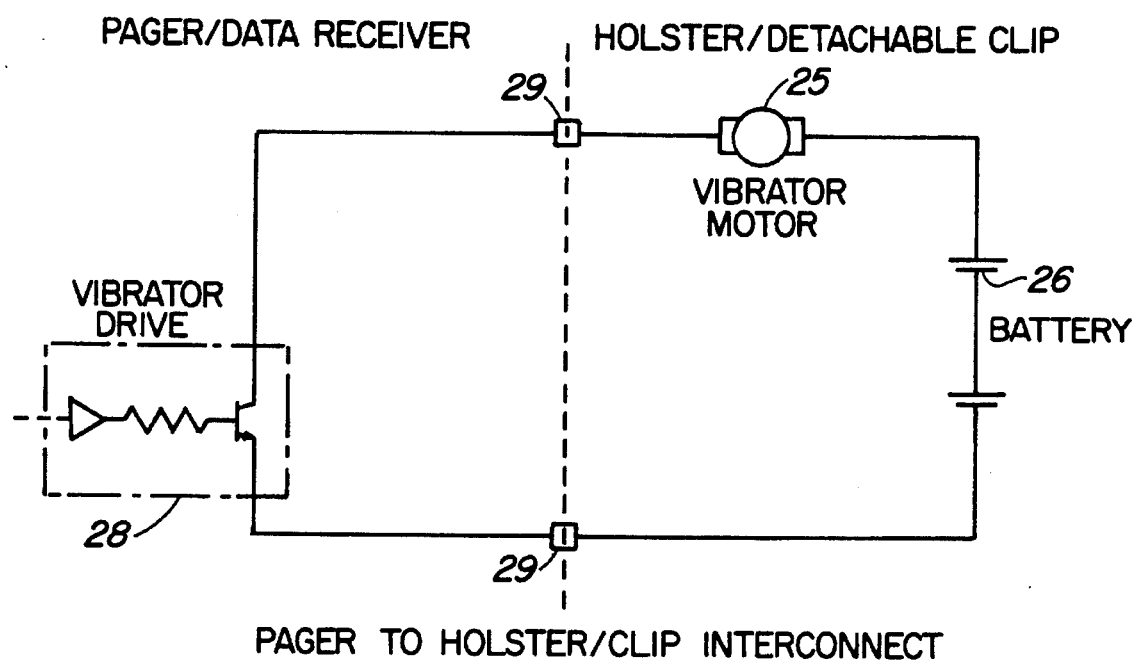

Integration of the vibrator motor and battery for its operation into the assembly provides a means to isolate the power supply of the pager or data receiver from that of the vibrator. A schematic of a vibrator driving circuit is shown in FIG. 9.

An external power source e.g. battery 26 does not require any active electronic circuitry to be integrated into the holster. The simple configuration shown in FIG. 9 provides operation of the external vibrator 25 and battery 26 by means of control circuits (of which the final vibrator drive 28 is shown) internal to the pager. Vibrator drive control is provided via connectors 29 which are closed when the pager is attached to the holster or detachable belt clip.

The current drain of a vibrator motor in operation is very high and for a partially exhausted battery, this large drain causes a substantial reduction in the terminal voltage. However calculation shows that the energy requirement to operate a vibrator in a pager is small compared to the continuous drain of the pager, for up to 10 vibrational alerts per day. It is commonly the case that pagers equipped with vibrators require the battery to be replaced more frequently than for audible alert pagers because the momentary terminal voltage under load is too low to support operation of the pager electronics. If the vibrator load were removed, the battery would provide lengthy additional service.

Separation of the power source for the pager and for the vibrator thus allows the battery within the pager or data receiver to be very much smaller and provides for the development of smaller devices. A vibrating alert can be provided by means of the holster or clip containing a vibrator and its power source as described herein.

A person understanding this invention may now conceive of alternative structures and embodiments or variations of the above. All of those which fall within the scope of the claims appended hereto are considered to be part of the present invention.

We claim:

1. A holster assembly for a radio pager or data receiver comprising:

(a) a holster for retaining said pager or receiver, the holster having a rear, (b) a clip rotatably fixed to the holster, (c) means for resiliently biasing the clip to the rear of the holster, (d) an actuator engaging said clip whereby by manually pinching the actuator to the holster, the clip is rotated away from the holster and by releasing the actuator the clip is resiliently biased toward the rear of the holster, (e) latching means for retaining the clip in a fixed position away from the holster upon the clip being manually pulled away from the holster, f) the clip and the actuator each rotating on an axle retained by the holster, and g) the clip and actuator each containing mutually interfacing faces rotating around said axle, the faces containing ramp pads which impart mutual stress parallel to the axis of the axle as the clip and actuator rotate relative to each other, said latching means comprising a stress relief means mutually engaged by said faces at a wide rotational angle of the clip relative to the actuator for retaining the clip in an open position until manually forced toward a closed position with said holster.

2. A holster assembly as defined in claim 1 in which the actuator faces are located on a pair of spaced legs, the clip extending from a drum contained between said legs and having end faces interfacing the facing actuator faces, said axle passing through said legs and drum, the holster having a pair of spaced towers, each interfacing the other side of respective ones of said legs and containing the ends of said axle, a preloaded helical spring contained within a tower and keyed to said tower and fixed to the clip for creating said resilience, and protruding C stops extending outwardly from the faces of the drum for providing a stop against which the actuator can bear to apply rotation pressure against the clip.

3. A holster assembly as defined in claim 2 further including vibrator means contained within one of the towers.

4. A holster assembly as defined in claim 3 further including a battery contained within a second one of the towers, connected to the vibrator, and a pair of connector terminals connected to the battery and vibrator for making contact with corresponding connector terminals of a pager or data receiver that may be contained within the holster whereupon current from the battery may be conducted in a circuit to the vibrator through the pager or data receiver and thus enabled thereby.

5. A holster as defined in claim 4 further including means for limiting the rotational movement of the actuator relative to the towers and means for limiting the rotational movement of the clip relative to the towers.

6. A holster as defined in claim 1 in which the stress relief means comprises a sharp angled end to each ramp.

* * * * *